June 28, 1960         A. V. LOUGHREN         2,943,270
ANGULAR-VELOCITY-MODULATED PERIODIC-SIGNAL-DEVELOPING SYSTEM
Filed June 9, 1954                           3 Sheets-Sheet 1

United States Patent Office 2,943,270
Patented June 28, 1960

2,943,270

ANGULAR-VELOCITY-MODULATED PERIODIC-SIGNAL-DEVELOPING SYSTEM

Arthur V. Loughren, Great Neck, N.Y., assignor to Hazeltine Research, Inc., Chicago, Ill., a corporation of Illinois Filed June 9, 1954, Ser. No. 435,474

10 Claims. (Cl. 332—19)

General

This invention relates to a system for developing a stabilized angular-velocity-modulated periodic signal deviating in phase over a wide range of phase deviation. As employed in the specification and claims, the term "angular-velocity-modulated signal" refers to a signal which may, for example, be phase-modulated, frequency-modulated, or modulated in accordance with a hybrid of phase modulation and frequency modulation. While the system is of general application, it is particularly useful in a frequency-modulation transmitter system of the phase-shift type and, hence, will be described in that environment.

In order not to exceed permissible output-signal distortion in various prior frequency-modulation transmitter systems of the phase-shift type, the maximum phase deviation of the modulated signal has heretofore been limited at the point of modulation to less than approximately ±150° and in some systems the permissible phase deviation is limited to ±30°. Greater phase deviation at the point of modulation in such systems generally results in modulation nonlinearity or introduces phase ambiguity into the modulated signal. Such prior systems have commonly employed frequency multipliers utilizing numerous electron tubes and other circuit components to multiply the frequency of the modulated signal and its corresponding phase deviation by factors in the range of 1,000 to 10,000 to provide an output-signal frequency of, for example, 160 megacycles and an output-signal frequency deviation of, for example, the currently prescribed standard of ±75 kilocycles. Such systems have the limitations of being more cumbersome and expensive than is desirable for some applications, such as those including mobile transmitters.

It is an object of the present invention, therefore, to provide a new and improved system for developing a stabilized angular-velocity-modulated periodic signal deviating in phase over a wide range of phase deviation which avoids one or more of the above-mentioned limitations of prior systems of this type.

It is another object of the invention to provide a new and improved system of the type described which is of relatively simple construction and reduces substantially the number of frequency-multiplier stages utilized.

It is another object of the invention to provide a new and improved system of the type described capable of developing a stabilized angular-velocity-modulated periodic signal deviating in phase over a range exceeding 360° without requiring phase-deviation multiplication.

In accordance with a particular form of the invention, a system for developing a stabilized angular-velocity-modulated periodic signal deviating in phase over a wide range of phase deviation comprises circuit means for supplying an angular-velocity-modulated periodic signal deviating in instantaneous relative phase over a wide range with respect to a phase reference. The system includes phase-responsive circuit means coupled to the aforesaid supply-circuit means and having one or more similar phase-response characteristics repetitive over relatively narrow phase-deviation ranges for developing separate signals individually representative of the instantaneous relative phase deviation of the periodic signal with respect to the phase reference. The system also includes circuit means including separate differentiating circuits coupled to the phase-responsive circuit means for deriving from the developed signals a control signal continuously approximately representative of the phase deviation over the aforesaid wide range and for applying the control signal to the supply-circuit means to maintain the mean relative phase of the periodic signal substantially constant with respect to the phase reference while the instantaneous relative phase deviates over the wide range.

For a better understanding of the present invention, together with other and further objects thereof, reference is had to the following description taken in connection with the accompanying drawings, and its scope will be pointed out in the appended claims.

Referring to the drawings.

Figure 1:
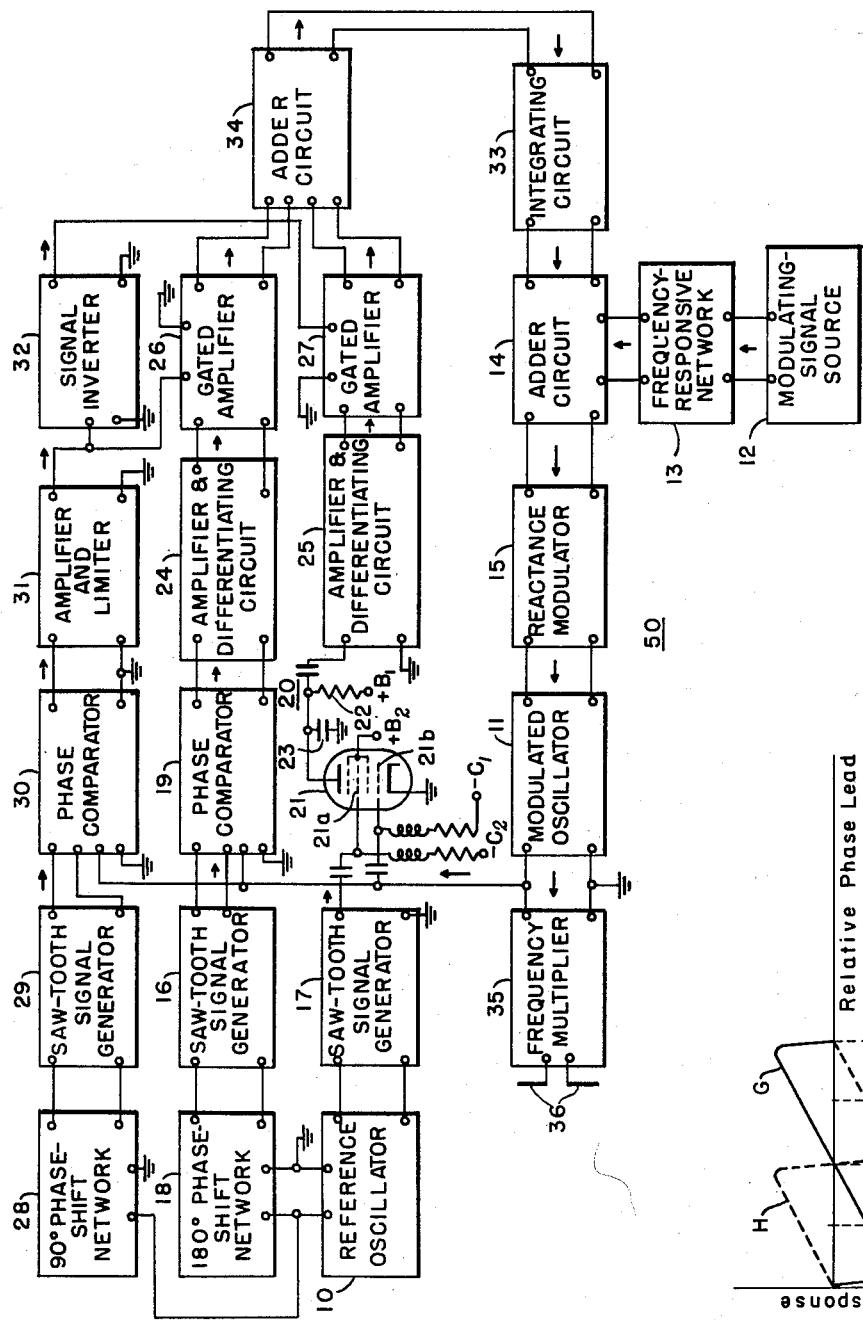
Fig. 1 is a circuit diagram, partly schematic, of a system for developing a stabilized angular-velocity-modulated periodic signal deviating in phase over a wide range of phase deviation, constructed in accordance with the invention.

Description of Fig. 1 system

Referring now more particularly to Fig. 1 of the drawings, there is represented a system 50 for developing a stabilized angular-velocity-modulated periodic signal deviating in phase over a wide range of phase deviation constructed in accordance with the invention and preferably comprising first circuit means, for example, a crystal-controlled reference oscillator 10 of a conventional type for supplying a first periodic phase-reference signal which may, for example, be a sinusoidal signal having a frequency of 10 megacycles.

The system also includes second circuit means for supplying an angular-velocity-modulated second periodic signal deviating in instantaneous relative phase over a wide range with respect to a phase reference comprising the first signal. The second circuit means preferably includes a modulated oscillator 11 of conventional construction for supplying a second sinusoidal signal having a mean frequency of, for example, 10 megacycles and a modulating-signal source 12 comprising, for example, any suitable audio-frequency signal source. The source 12 is coupled to a conventional frequency-responsive network 13 which preferably has a frequency-response characteristic varying inversely with frequency for modifying the amplitude characteristic of the modulating signal supplied by the source 12 in order that the system 50 develop a frequency-modulated output signal. An adder circuit 14 is coupled between the network 13 and a conventional reactance modulator 15 which is, in turn, connected to the modulated oscillator 11 for varying the operating frequency of the oscillator 11 to cause the instantaneous relative phase deviation of the signal developed by that oscillator to vary with respect to the first signal supplied by the oscillator 10 over a range exceeding 360°, for example, in accordance with an approximately linear control-signal operating-frequency characteristic.

There is also provided phase-responsive circuit means coupled to the supply-circuit means 10 and 11–15 and preferably having one or more similar phase-response characteristics repetitive and substantially linear over relatively narrow phase-deviation ranges of, for example, less than 360° and phase-displaced by, for example, approximately 180° for developing one or more signals individually representative of the instantaneous relative phase deviation of the first and second signals. More particularly, the phase-responsive circuit means comprises, for example, a saw-tooth signal generator 17, of conventional construction, connected to the oscillator 10 and a similar saw-tooth signal generator 16 coupled to the oscillator 10 through a 180° phase-shift network 18 of a conventional type for generating saw-tooth signals individually synchronized with the first signal supplied by the oscillator 10 but phase-displaced from each other by approximately 180°. The phase-responsive circuit means also preferably includes a pair of similar phase comparators 19 and 20 coupled to the generators 16 and 17, respectively, and to the oscillator 11 for effecting phase comparisons of the signals applied thereto. The comparator 20 includes a normally nonconductive tube 21 having control electrodes 21a and 21b coupled to the saw-tooth signal generator 17 and modulated oscillator 11, respectively. The output circuit of the comparator 20 includes a resistor-condenser network 22, 23 preferably having a long time constant relative to the operating frequency of the oscillator 11 for developing a continuous output signal representative of the relative phase of the signals applied to the comparator 20.

The system also includes circuit means coupled to the phase-responsive circuit means 16–20, inclusive, for deriving from the signals developed thereby a control signal continuously approximately representative of the wide range phase deviation of the first and second signals supplied by the oscillators 10 and 11, respectively, and for applying the control signal to the second supply-circuit means 11–15, inclusive, to maintain the mean relative phase of the first and second signals substantially constant during the instantaneous relative phase deviation over the wide range. More particularly, this control-signal deriving-circuit means preferably comprises a pair of amplifier and differentiating circuits 24, 25 coupled to the phase comparators 19 and 20, respectively, for deriving from the signals developed thereby signals individually representing the rate of change of magnitude thereof.

The control-signal deriving-circuit means preferably also includes a pair of gated signal amplifiers 26 and 27 coupled to the amplifier and differentiating circuits 24 and 25, respectively, for translating the signals derived thereby with relative values determined by the phase deviation and coupled to an adder circuit 34 for deriving a composite signal representative of the rate of change of phase deviation. The control-signal deriving-circuit means also includes an integrating circuit 33 coupled to the adder circuit 34 for integrating the composite signal derived by the amplifiers 26 and 27 to develop the control signal.

There is coupled to the oscillator 10 and to the amplifiers 26 and 27 gate-signal generating means for maintaining one of the amplifiers 26 in a translating condition over first phase-spaced ranges of phase deviation and for maintaining the other amplifier 27 in a translating condition over second intervening phase-spaced ranges of phase deviation. The gate-signal generating means comprises, for example, a 90° phase-shift network 28 of a conventional type coupled between the reference oscillator 10 and a saw-tooth signal generator 29 which may be of similar construction to the generators 16 and 17. The saw-tooth signal generator 29 is connected to a phase comparator 30 which may be of similar construction to the phase comparators 19 and 20 and the phase comparator 30 is coupled to the gating-signal input circuit of the gated amplifier 26 through an amplifier and limiter 31 of conventional construction and to the gating-signal input circuit of the amplifier 27 through the amplifier and limiter 31 and a signal inverter 32 of conventional construction connected in cascade with the amplifier and limiter 31 for operating purposes more fully explained subsequently.

A conventional frequency multiplier 35 is coupled to the oscillator 11 for multiplying the frequency of the frequency-modulated output signal of the oscillator 11 by, for example, a factor of 16 to develop an output signal having a frequency of, for example, 160 megacycles and for applying the developed signal to antenna 36, 36 for radiation. All of the individual units of the Fig. 1 system may be of conventional construction and operation so that a detailed description and explanation of the internal operations thereof are deemed unnecessary.

*Operation of Fig. 1 system*

Figure 2A:
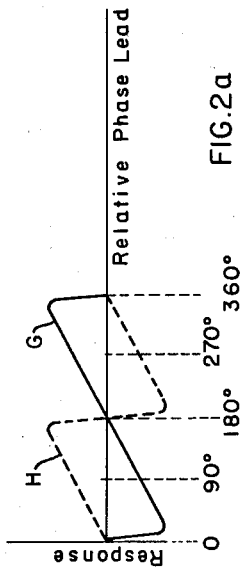
Fig. 2a is a graph representing the phase-response characteristics of units of the Fig. 1 system.
Figure 2:
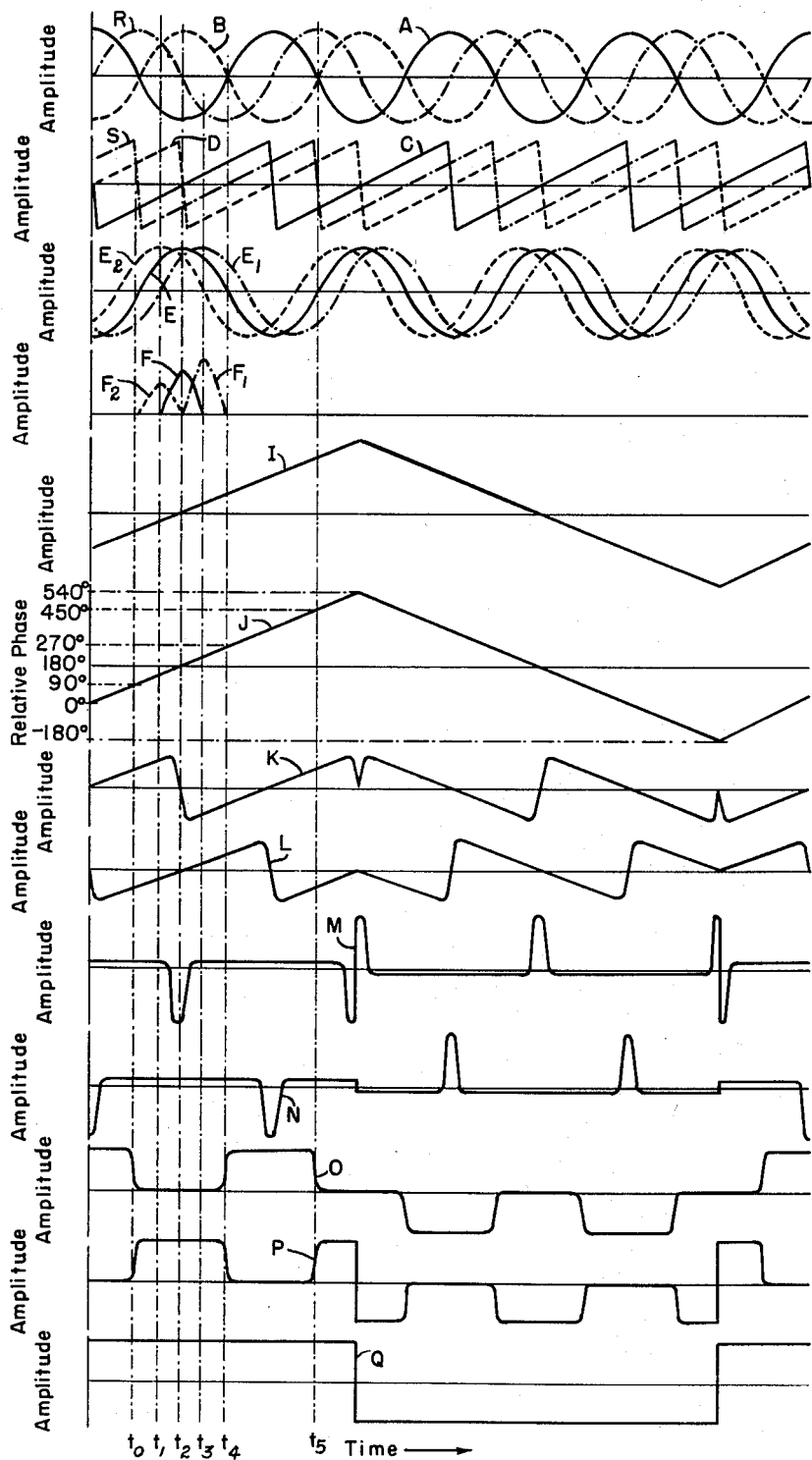
Fig. 2 is a graph representing characteristics of signals developed at various points of the Fig. 1 system.

Considering now the operation of the Fig. 1 system, the oscillator 10 preferably develops a sinusoidal reference signal having a frequency of, for example, 10 megacycles and represented by solid-line curve A of Fig. 2. The curves of Fig. 2, except curves O, P, Q, are intended primarily to represent phase relations of the various signals rather than amplitude relations. The signal supplied by the oscillator 10 and represented by curve A is applied to the saw-tooth signal generator 17 and is inverted by the 180° phase-shift network 18 and then applied to the saw-tooth signal generator 16. In response to the signals applied thereto, the generators 17 and 16 develop periodic saw-tooth signals represented by solid-line and dashed-line curves C and D, respectively. The generators 16 and 17 apply the saw-tooth signals to input circuits of the phase camparators 19 and 20, respectively.

The oscillator 11 when unmodulated develops a signal, represented by solid-line curve E, of the same frequency as the signal supplied by the oscillator 10 but, for example, 180° out of phase therewith. The oscillator 11 supplies the signal represented by curve E to input circuits of the phase comparators 19 and 20 respectively, for phase comparison with the saw-tooth signals represented by curves D and C, respectively.

Considering now the operation of the phase comparator 20 in detail, the signal represented by curve C is applied by the generator 17 to the control electrode 21a of the tube 21 while the signal represented by curve E is applied to the control electrode 21b by the oscillator 11. Electrode 21b of the tube 21 preferably is so biased that the tube is nonconductive during the entire period of the sinusoidal signal represented by curve E except during an interval $t_1$–$t_3$ during which the peak of that signal occurs. At this time, a pulse of current flow, represented by solid-line curve F, flows through the resistor-condenser network 22, 23 and the tube 21 driving the anode of the tube in a negative sense and charging the condenser 23.

When the output signal of the oscillator 11 has the phase indicated, for example, by broken-line curve $E_1$ of Fig. 2 and, thus, leads the reference signal represented by curve A by less than 180°, the peak of the output signal of the oscillator 11 occurs, for example, at time $t_3$. Accordingly, because of the more positive potential of the signal represented by curve C at that time $t_3$, a current pulse of greater amplitude represented by broken-line curve $F_1$ flows through the tube 21. Analogously, when the output signal of the oscillator 11 leads the signal represented by curve A by more than 180° and has a peak which occurs, for example, at time $t_1$ as represented by broken-line curve $E_2$, a current pulse of smaller amplitude flows through the tube 21, as represented by curve $F_2$. Because of the long time constant of the resistor-condenser network 22, 23, that network derives a potential having an amplitude varying with the amplitude of the anode-cathode current pulses of the tube 21 and, thus, varying with the relative phase lead of the output signal of the oscillator 11 with respect to the signal supplied by the reference oscillator 10.

The phase-response characteristics of the saw-tooth signal generator 17 and phase comparator 20 and of the saw-tooth signal generator 16 and phase comparator 19 are represented by curves G and H, respectively, of Fig. 2a in terms of the response of these units to a relative phase lead of the signal supplied by the oscillator 11 with respect to the signal supplied by the oscillator 10 over a phase range of 360°. It will be understood, of course, that if the phase lead is increased beyond 360°, the apparent phase lead is nevertheless in the range of 0°–360°.

While the modulating-signal source may supply a modulating signal comprising a wide range of frequency components, for the sake of clarity, it will be assumed that the source 12 supplies a modulating signal which may be represented by curve I of Fig. 2 after translation by the frequency-responsive network 13. The network 13 supplies the signal represented by curve I to the adder circuit 14 which develops an output signal of substantially the same wave form but of reduced amplitude, as will be more fully explained subsequently. The output signal of the adder circuit is applied to the reactance modulator 15 which then causes the phase of the output signal of the oscillator 11 to deviate over a wide range of, for example, 720° between −180° to +540° with respect to the output signal of the reference oscillator 10 in the linear manner represented by curve J of Fig. 2. It will be understood that a wider range of phase deviation may be provided by, for example, the application to the reactance modulator 15 of a signal of greater amplitude. In accordance with the previously described phase-response characteristics of the saw-tooth signal generators 16, 17 and phase comparators 19, 20, the units 19 and 20 develop output signals represented by curves K and L, respectively, which individually represent the instantaneous relative phase deviation of the output signals of the oscillators 10 and 11 as derived in accordance with the two different phase-response characteristics of units 19 and 20. The output signals of units 19 and 20, represented by curves K and L, respectively, however, do not include a component representing the steady-state component of the instantaneous relative phase deviation of the output signals of the oscillators which is determined by the constant of integration of unit 33.

The signals represented by curves K and L are applied to the amplifier and differentiating circuits 24 and 25, respectively, which derive therefrom the signals represented by curves M and N, respectively. The signals of curves M and N represent the rate of change of magnitude of the signals of curves K and L.

During intervals, such as $t_0$–$t_4$, when the relative phase deviation of the output signal of the oscillator 11, represented by curve E, is in a first 180° range of, for example, 90°–270°, the signal represented by curve L is derived by the phase comparator 20 in accordance with the portion of the phase-response characteristic represented by curve G which is substantially linear and of positive slope. During intervals, such as $t_4$–$t_5$, when the relative phase of the output signal of the oscillator 11 is in a second 180° range of 270°–450° or an apparent range of 270°–360° and 0°–90° with respect to its reference phase represented by curve E, the output signal of the phase comparator 19 represented by curve K is derived from the substantially linear portion of positive slope of the phase-response characteristic represented by curve H. Accordingly, since the relative phase deviation of the output signal of the oscillator 11 varies linearly with time during the interval $t_0$–$t_5$, the rate of change of magnitude of the signal represented by curve K during the interval $t_4$–$t_5$ is substantially the same as that of the signal represented by curve L during the interval $t_0$–$t_4$. Thus, since the signals represented by curves M and N represent the rate of change of magnitude of the signals represented by curves K and L, respectively, the signal represented by curve M has the same magnitude during the interval $t_4$–$t_5$ as does the signal represented by curve N during the interval $t_0$–$t_4$.

The signals represented by curves M and N are applied to the gated amplifiers 26 and 27, respectively, which derive output signals represented by curves O and P, respectively, in a manner more fully explained subsequently. The output signals represented by curves O and P have magnitudes representative of the magnitudes of the signals represented by curves M and N, respectively, during intervals when the signals represented by curves M and N individually are derived in accordance with the substantially linear portions of positive slopes of the phase-response characteristics represented by curves G and H of Fig. 2a. During intervals when the signals represented by curves M and N are not derived in accordance with the above-mentioned portions of the phase-response characteristics, the amplifiers 26 and 27 are individually gated to a nontranslating condition. Thus, as the output signal of the oscillator 11 sweeps linearly across a 720° phase range of −180° to +540° in the manner represented by curve J, the amplifiers 26 and 27 alternately translate selected portions of the signals applied thereto to derive the signals represented by curves O and P, respectively.

The amplifiers 26 and 27 apply the signals represented by curves O and P to the adder circuit 34 which additively combines these signals to derive an output signal represented by curve Q, which is representative of the rate of change of phase deviation of the output signal of the oscillator 11 with respect to the output signal of the oscillator 10. The adder circuit 34 applies the signal represented by curve Q to the integrating circuit 33 which derives therefrom a signal of substantially the same wave form as the signal represented by curve I and, for example, a few decibels or less below the signal level thereof. The integrating circuit 33 then applies the derived signal to the adder circuit 14 with subtractive polarity with respect to the signal supplied to the adder circuit by the frequency-responsive network 13 to develop a resultant output signal of reduced amplitude, as mentioned previously.

The signal developed by the integrating circuit 33, therefore, is effective to stabilize the mean relative phase of the output signal of the oscillator 11 with respect to the output signal of the oscillator 10 and does not distort the frequency-modulation components of the output signal of the oscillator 11 because it is of substantially the same wave form as the modulating signal supplied by the frequency-responsive network 13. Accordingly, the oscillator 11 develops a stabilized modulated output signal which may be frequency-multiplied by the multiplier 35 and radiated by the antenna 36.

Considering now the operation of the gate-signal generating means 28–32, inclusive, the reference oscillator 10 applies its output signal to the 90° phase-shift network 28 which derives therefrom a signal represented in Fig. 2 by curve R in dot-dash construction and which, for example, lags the output signal of the oscillator 10 represented by curve A by 90°.

The signal represented by curve R is applied by the network 28 to the saw-tooth signal generator 29 which derives therefrom a saw-tooth signal, represented by dot-dash curve S, in a manner similar to the operation of the generators 16 and 17. The generator 29 applies the saw-tooth signal represented by curve S to the phase comparator 30 which develops an output signal representative of the instantaneous relative phase of the output signal of the oscillator 11 and the saw-tooth signal generator 29 by operation similar to that of units 19 and 20.

During time intervals, such as $t_0$–$t_4$, when the instantaneous relative phase of the output signals of the reference oscillator 10 and modulated oscillator 11 is in a range of 90°–270° and the phase comparator 20 derives an output signal represented by curve L in accordance with the positive slope portion of the phase-response characteristic represented by curve G of Fig. 2a, the phase comparator 30 develops a negative output signal which is amplified and limited in unit 31. The amplifier and limiter 31 applies the negative signal to the signal inverter 32 which, in turn, applies a positive gate signal to the gated amplifier 27 to maintain it in a translating condition over a 180° phase range corresponding to the time interval $t_0$–$t_4$ to derive the signal represented by curve P.

During the time interval $t_0$–$t_4$, the amplifier and limiter 31 also applies the negative output signal thereof to the gated amplifier 26 to maintain the amplifier 26 in a nontranslating condition during that time interval, as indicated by curve O. The system operates in this mode during the time interval $t_0$–$t_4$ to prevent translation of the output signal of the phase comparator 19 which is derived during this interval in accordance with a nonlinear portion of its phase-response characteristic represented by curve H of Fig. 2a. During a time interval, such as $t_4$–$t_5$, corresponding to the instantaneous relative phase deviation of the output signals of the oscillators 10 and 11 in the range of, for example, 270°–450°, the phase comparator 30 develops a positive output signal to maintain the amplifier 26 in a translating condition and the amplifier 27 in a nontranslating condition. These amplifiers then operate alternately in a manner analogous to that just described.

Figure 3:
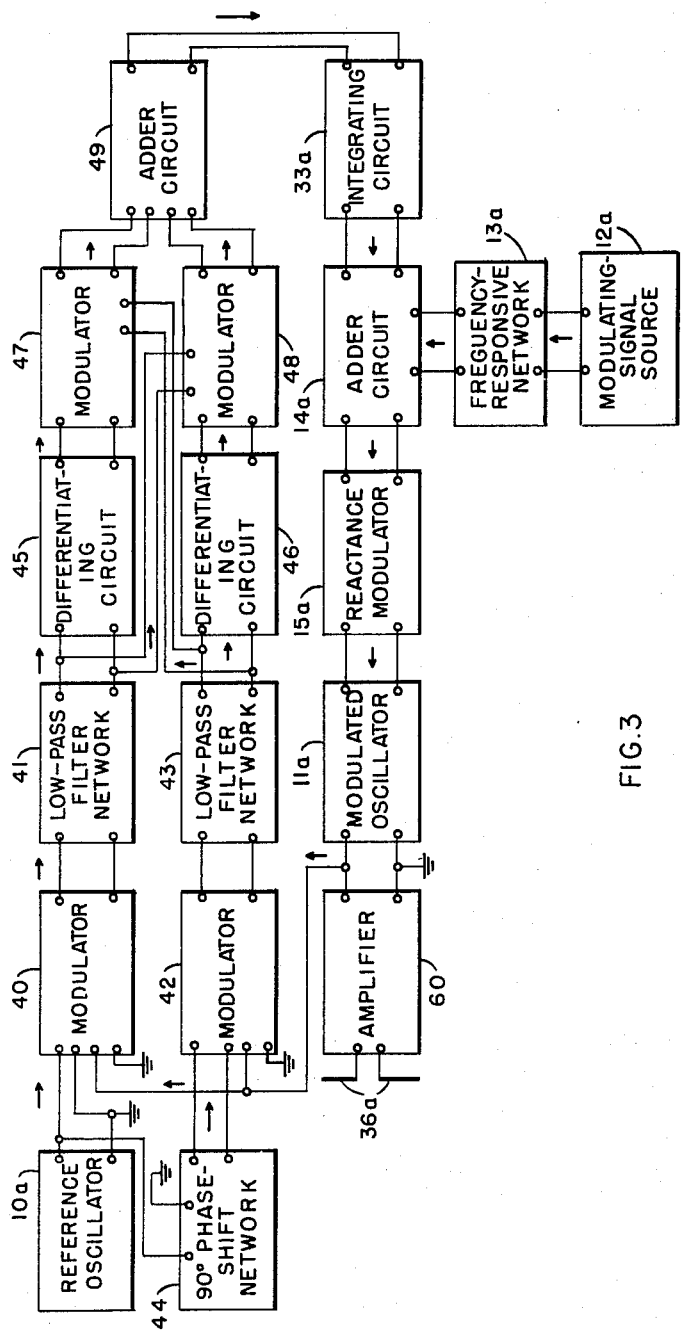
Fig. 3 is a modification of the system represented in Fig. 1 and constructed in accordance with the invention.

Description of Fig. 3 system

Referring now more particularly to Fig. 3 of the drawings, there is represented a modified system, constructed in accordance with the invention, particularly useful for high-frequency operation in the range of, for example, 160 megacycles without requiring frequency multiplication. Units 10a–15a, inclusive, 33a, and antenna 36a, 36a of the Fig. 3 embodiment may be of similar construction and operation to corresponding units of the Fig. 1 embodiment and an amplifier 60 is utilized in lieu of a frequency multiplier, such as unit 35 of the Fig. 1 embodiment.

The Fig. 3 embodiment includes, in addition to the units just mentioned, a pair of phase-responsive circuits coupled to oscillators 10a and 11a and having a pair of substantially sinusoidal phase-response characteristics extending over quadrature-phase-displaced relatively narrow phase-deviation ranges for developing signals individually representative of quadrature-phase-displaced sinusoidal functions of the instantaneous relative phase deviation of the signals supplied by the oscillators 10a and 11a. More particularly, the phase-responsive circuits comprise a modulator 40 and low-pass filter network 41 of conventional construction connected to the reference oscillator 10a and modulated oscillator 11a and a modulator 42 and low-pass filter network 43 which may be of similar construction to the units 40 and 41, respectively, connected to the modulated oscillator 11a and coupled through a 90° phase-shift network 44 to the oscillator 10a.

First and second differentiating circuits 45, 46 are coupled to the low-pass filter networks 41 and 43, respectively, for deriving signals representing the rate of change of magnitudes of the signals applied thereto by the filter networks. The system also includes modulators 47 and 48 coupled to the first and second differentiating circuits 45 and 46, respectively, and to the low-pass filter networks 43 and 41, respectively, for developing resultant signals individually representing the products of the signals applied thereto. The cutoff frequencies of the filter networks 41 and 43 lie substantially below the frequencies of oscillators 10a and 11a and preferably are higher than the highest modulating frequency supplied by the frequency-responsive network 13a and higher than the highest instantaneous frequency deviation to be faithfully transmitted. There is also provided an adder circuit 49 coupled to the modulators 47 and 48 for combining the resultant signals to derive a composite signal representative of the rate of change of phase deviation.

Operation of Fig. 3 system

Considering now the operation of the Fig. 3 system, units 11a–15a, inclusive, operate in a manner similar to the corresponding units of the Fig. 1 system to develop a periodic signal having an instantaneous relative phase deviating with respect to the reference signal supplied by oscillator 10a.

The output signal of the oscillator 10a may be expressed by Equation 1. In the following equations, the symbol $e$ subscribed and the symbol $k$ subscribed represent instantaneous signal magnitudes and amplitude factors, respectively, $\omega$ represents angular velocity and $t$ represents time.

$$e_1 = k_1 \sin \omega t \tag{1}$$

The signal expressed by Equation 1 is supplied by the oscillator 10a to the modulator 40 and to the 90° phase-shift network 44 which derives therefrom, for example, a signal represented by Equation 2.

$$e_2 = k_2 \cos \omega t \tag{2}$$

The network 44 applies the signal represented by Equation 2 to an input circuit of the modulator 42.

The output signal of the oscillator 11a may be represented by Equation 3.

$$e_3 = k_3 (\sin \omega t + \theta) \tag{3}$$

where $\theta$ represents instantaneous phase lead of signal $e_3$ with respect to signal $e_1$.

The signals applied to the modulators 40 and 42 beat together therein to develop signals expressed by Equations 4 and 5, respectively.

$$e_1 e_3 = k_4 (\cos \theta - \cos (2\omega t + \theta)) \tag{4}$$

$$e_2 e_3 = k_5 (\sin \theta + \sin (2\omega t + \theta)) \tag{5}$$

The modulators 40 and 42 apply the signals expressed by Equations 4 and 5 to the low-pass filter networks 41 and 43, respectively, which translate only the low-frequency components thereof to derive signals represented by Equations 6 and 7, respectively.

$$e_4 = k_6 \cos \theta \tag{6}$$

$$e_5 = k_7 \sin \theta \tag{7}$$

The output signals of the filter networks 41 and 43 are applied to the differentiating circuits 45 and 46, respectively, which derive signals representing the rate of change of magnitude thereof as expressed in Equations 8 and 9, respectively.

$$e_6 = \frac{de_4}{dt} = k_8 \sin \theta \frac{d\theta}{dt} \tag{8}$$

$$e_7 = \frac{de_5}{dt} = k_9 \cos \theta \frac{d\theta}{dt} \tag{9}$$

The output signals of differentiating circuits 45 and 46 represented by Equations 8 and 9, respectively, are applied to input circuits of the modulators 47 and 48, respectively, while the output signals of the low-pass filter networks 41 and 43 represented by Equations 6 and 7, respectively, are applied to input circuits of the modulators 48 and 47, respectively. The signals applied to the modulators 47 and 48 beat together therein to derive the output signals expressed in Equations 10 and 11, respectively.

$$e_8 = k_{10} \sin^2 \theta \frac{d\theta}{dt} \tag{10}$$

$$e_9 = k_{11} \cos^2 \theta \frac{d\theta}{dt} \tag{11}$$

The output signals of the modulators 47 and 48 are applied with proper additive polarity to the adder circuit 49 wherein they are combined to develop a signal expressed by Equation 12.

$$e_{10} = k_{12}(\sin^2\theta + \cos^2\theta)\frac{d\theta}{dt} \qquad (12)$$

It will be seen that the signal expressed by Equation 12 has an instantaneous magnitude which is proportional to a rate of change of phase deviation of the output signal of the oscillator 11a with respect to the output signal of the oscillator 10a. Accordingly, the signal expressed by Equation 12 is applied to the integrating circuit 33a which integrates the signal to develop a signal represented by Equation 13.

$$e_{11} = \int_0^t e_{10}\,dt = k_{12}\theta + C \qquad (13)$$

where C represents a steady-state component determined by the constant of integration of circuit 33a.

As expressed in Equation 13, the instantaneous magnitude of the integrated signal is representative of the instantaneous relative phase deviation of the output signal of the oscillator 11a with respect to the output signal of the oscillator 10a. This signal is applied to the adder circuit 14a with subtractive polarity to stabilize the operation of the modulated oscillator 11a in a manner similar to the operation of corresponding units of the Fig. 1 embodiment.

It will be understood that the width of the modulation band of the output signals of the Figs. 1 and 3 embodiments preferably is suitably restricted relative to the output-signal frequency so that the maximum rate of change of the instantaneous phase deviation thereof does not exceed 180° per second at the output-signal frequency. A conventional frequency-modulation signal receiver can then be employed to receive the output signals of the various embodiments of the invention.

From the foregoing description, it will be apparent that a system constructed in accordance with the invention for developing a stabilized angular-velocity-modulated periodic signal deviating in phase over a wide range of phase deviation has the advantage of substantially reducing the number of frequency-multiplier stages utilized to provide the desired output-signal phase deviation. The system also has the advantage of utilizing phase-responsive units which may be of relatively simple construction for providing the phase deviation over a range exceeding 360°.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for developing a stabilized angular-velocity-modulated periodic signal deviating in phase over a range of phase deviation exceeding 360° comprising: a first oscillator for supplying a first sinusoidal reference signal; a second oscillator for supplying an angular-velocity-modulated second sinusoidal signal; a modulator for varying the operating frequency of said second oscillator to cause instantaneous relative phase deviation of said second signal with respect to said first signal over a range exceeding 360°; a pair of saw-tooth signal generators coupled to said first oscillator for generating saw-tooth signals individually synchronized with said first signal but phase displaced from each other by approximately 180°; a pair of phase comparators individually coupled to said saw-tooth signal generators and coupled to said second oscillator and having in combination with said generators a pair of phase-response characteristics similar and substantially linear over phase-deviation ranges of less than 360° and phase displaced by approximately 180° for developing a pair of signals individually representative of the instantaneous relative phase deviation of said first and second signals; a pair of differentiating circuits individually coupled to said phase comparators for deriving from said developed signals signals individually representing the rate of change of magnitude thereof; circuit means coupled to said differentiating circuits and to said oscillators for combining said derived signals with relative values determined by said phase deviation to derive a composite signal representative of the rate of change of said phase deviation; and circuit means coupled to said signal-combining circuit means for integrating said composite signal to derive a control signal continuously approximately representative of said phase deviation over said range exceeding 360° and for applying said control signal to said modulator to maintain the mean relative phase of said first and second signals substantially constant while said instantaneous relative phase deviates over said range.

2. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; phase-responsive circuit means coupled to said supply-circuit means and having a plurality of phase-response characteristics similar over relatively narrow phase-deviation ranges for developing separate signals individually representative of the instantaneous relative phase deviation of said first and second signals; and circuit means including separate differentiating circuits coupled to said phase-responsive circuit means for deriving from said developed signals a control signal continuously approximately representative of said phase deviation over said wide range and for applying said control signal to said second supply-circuit means to maintain the mean relative phase of said first and second signals substantially constant while said instantaneous relative phase deviates over said wide range.

3. A system for developing a stabilized angular-velocity-modulated periodic signal deviating in phase over a range of phase deviation exceeding 360° comprising: first circuit means for supplying a first periodic reference signal; second circuit means for supplying an angular-velocity-modulated second periodic signal deviating in instantaneous relative phase with respect to said first signal over a range exceeding 360°; phase-responsive circuit means coupled to said supply-circuit means and having a plurality of phase-response characteristics similar and substantially linear over phase-displaced phase-deviation ranges of less than 360° for developing a pair of signals individually representative of the instantaneous relative phase deviation of said first and second signals; and circuit means including a pair of differentiating circuits coupled to said phase-responsive circuit means for deriving from said developed signals a control signal continuously approximately representative of said phase deviation over said range exceeding 360° and for applying said control signal to said second supply-circuit means to maintain the mean relative phase of said first and second signals substantially constant while said instantaneous relative phase deviates over said range.

4. A system for developing a stabilized angular-velocity-modulated periodic signal deviating in phase over a range of phase deviation exceeding 360° comprising: first circuit means for supplying a first periodic reference signal; second circuit means for supplying an angular-velocity-modulated second periodic signal deviating in instantaneous relative phase with respect to said first signal over a range exceeding 360°; phase-responsive circuit means coupled to said supply-circuit means and having a plurality of phase-response characteristics similar and substantially linear over phase-deviation ranges of less than 360° and phase-displaced by approximately 180° for developing a pair of signals individually representative of the instantaneous relative phase deviation of said first and second signals; and circuit means including a pair of differentiating circuits coupled to said phase-responsive circuit means for deriving from said developed signals a control signal continuously approximately representative of said phase deviation over said range exceeding 360° and for applying said control signal to said second supply-circuit means to maintain the mean relative phase of said first and second signals substantially constant while said instantaneous relative phase deviates over said range.

5. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; a pair of saw-tooth signal generators coupled to said first supply-circuit means for generating saw-tooth signals individually synchronized with said first signal but phase-displaced from each other by approximately 180°; a pair of phase comparators individually coupled to said saw-tooth signal generators and coupled to said second signal-supply-circuit means and having in combination with said generators a pair of phase-response characteristics similar over phase-displaced relatively narrow phase-deviation ranges for developing a pair of signals individually representative of the instantaneous relative phase deviation of said first and second signals; and circuit means including a pair of differentiating circuits coupled to said phase-responsive circuit means for deriving from said developed signals a control signal continuously approximately representative of said phase deviation over said wide range and for applying said control signal to said second supply-circuit means to maintain the mean relative phase of said first and second signals substantially constant while said instantaneous relative phase deviates over said wide range.

6. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; a pair of phase-responsive circuits coupled to said supply-circuit means and having a pair of substantially sinusoidal phase-response characteristics extending over quadrature-phase-displaced relatively narrow phase-deviation ranges for developing a pair of signals individually representative of quadrature-phase-displaced sinusoidal functions of the instantaneous relative phase deviation of said first and second signals; and circuit means including a pair of differentiating circuits coupled to said phase-responsive circuits for deriving from said developed signals a control signal continuously approximately representative of said phase deviation over said wide range and for applying said control signal to said second supply-circuit means to maintain the mean relative phase of said first and second signals substantially constant while said instantaneous relative phase deviates over said wide range.

7. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; phase-responsive circuit means coupled to said supply-circuit means and having a plurality of phase-response characteristics similar over phase-displaced relatively narrow phase-deviation ranges for developing a pair of signals individually representative of the instantaneous relative phase deviation of said first and second signals; circuit means including a pair of differentiating circuits coupled to said phase-responsive circuit means for deriving from relative values of said developed signals determined by said phase deviation a composite signal representative of the rate of change of said phase deviation over said wide range; and circuit means coupled to said signal-deriving circuit means for integrating said composite signal to derive a control signal continuously approximately representative of said phase deviation over said wide range and for applying said control signal to said second supply-circuit means to maintain the mean relative phase of said first and second signals substantially constant while said instantaneous relative phase deviates over said wide range.

8. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; a pair of phase-responsive circuits coupled to said supply-circuit means and having a pair of phase-response characteristics similar over phase-displaced relatively narrow phase-deviation ranges for developing a pair of signals individually representative of the instantaneous relative phase deviation of said first and second signals; a pair of differentiating circuits individually coupled to said phase-responsive circuits for deriving from said developed signals signals individually representing the rate of change of magnitude thereof; circuit means coupled to said differentiating circuits and to said supply-circuit means for combining said derived signals with relative values determined by said phase deviation to derive a composite signal representative of the rate of change of said phase deviation; and circuit means coupled to said signal-combining circuit means for integrating said composite signal to derive a control signal continuously approximately representative of said phase deviation over said wide range and for applying said control signal to said second supply-circuit means to maintain the mean relative phase of said first and second signals substantially constant while said instantaneous relative phase deviates over said wide range.

9. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; a pair of phase-responsive circuits coupled to said supply-circuit means and having a pair of phase-response characteristics similar over phase-displaced relatively narrow phase-deviation ranges for developing a pair of signals individually representative of the instantaneous relative phase deviation of said first and second signals; a pair of differentiating circuits individually coupled to said phase-responsive circuits for deriving from said developed signals signals individually representing the rate of change of magnitude thereof; a pair of gated signal repeaters individually coupled to said differentiating circuits for translating selected portions of said derived signals; gate-signal generating means coupled to said supply-circuit means and to said repeaters for maintaining one of said repeaters in a translating condition over first phase-spaced ranges of phase deviation and for maintaining the other of said repeaters in a translating condition over second intervening phase-spaced ranges of phase deviation; an adder circuit coupled to said repeaters for combining said selected signal portions to derive a composite signal representative of the rate of change of said phase deviation; and circuit means coupled to said adder circuit for integrating said composite signal to derive a control signal continuously approximately representative of said phase deviation over said wide range and for applying said control signal to said second supply-circuit means to maintain the mean relative phase of said first and second signals substantially constant while said instantaneous relative phase deviates over said wide range.

10. A system for developing a stabilized angular-velocity-modulated periodic signal deviating in phase over a wide range of phase deviation comprising: first circuit means for supplying a first periodic reference signal; second circuit means for supplying an angular-velocity-modulated second periodic signal deviating in instantaneous relative phase over a wide range with respect to said first signal; a pair of phase-responsive circuits coupled to said supply-circuit means and having a pair of substantially sinusoidal phase-response characteristics extending over quadrature-phase-displaced relatively narrow phase-deviation ranges for developing a pair of signals individually representative of quadrature-phase-displaced sinusoidal functions of the instantaneous relative phase deviation of said first and second signals; first and second differentiating circuits coupled to said first and second phase-responsive circuits, respectively, for deriving signals representing the rate of change of magnitude of said developed signals; first and second modulators coupled to said first and second differentiating circuits and to said second and first phase-responsive circuits, respectively, for developing resultant signals individually representing the products of the signals applied thereto; an adder circuit coupled to said modulators for combining said resultant signals to derive a composite signal representative of the rate of change of said phase deviation; and circuit means coupled to said adder circuit for integrating said composite signal to derive a control signal continuously approximately representative of said phase deviation over said wide range and for applying said control signal to said second supply-circuit means to maintain the mean relative phase of said first and second signals substantially constant while said instantaneous relative phase deviates over said wide range.

References Cited in the file of this patent

UNITED STATES PATENTS

| | | |
|---|---|---|
| 2,041,855 | Ohl | May 26, 1936 |
| 2,556,226 | Shadowitz et al. | June 12, 1951 |
| 2,596,227 | Fernsler | May 13, 1952 |
| 2,669,693 | Norton | Feb. 16, 1954 |

FOREIGN PATENTS

| | | |
|---|---|---|
| 497,731 | Canada | Nov. 17, 1953 |
| 577,019 | Great Britain | May 1, 1946 |
| 944,427 | France | Nov. 2, 1948 |

OTHER REFERENCES (Pub. I), Modulation Theory, Black, D. Van Nostrand Co. Inc. 1953, pp. 192–194.

(Pub. II), Radio Engineers Handbook, Terman, McGraw-Hill Book Co., 1943, pp. 582–585.

(Pub. III), Frequency Modulation, Hund, McGraw-Hill Book Co., 1942, pp. 42 and 43.